(12) United States Patent
Katsev

(10) Patent No.: US 10,560,543 B2
(45) Date of Patent: Feb. 11, 2020

(54) RULE BASED CACHE PROCESSING IN APPLICATION DELIVERY CONTROLLER FOR LOAD BALANCING

(71) Applicant: Fortinet, Inc, Sunnyvale, CA (US)

(72) Inventor: Sergey Katsev, Pleasant Valley, NY (US)

(73) Assignee: Fortinet, Inc., Sunnyvale, CA (US)

( * ) Notice: Subject to any disclaimer, the term of this patent is extended or adjusted under 35 U.S.C. 154(b) by 645 days.

(21) Appl. No.: 14/669,367

(22) Filed: Mar. 26, 2015

(65) Prior Publication Data
US 2016/0285992 A1 Sep. 29, 2016

(51) Int. Cl.
*H04L 29/08* (2006.01)

(52) U.S. Cl.
CPC .......... *H04L 67/2842* (2013.01); *H04L 67/02* (2013.01); *H04L 67/1014* (2013.01); *H04L 67/22* (2013.01); *H04L 67/2852* (2013.01)

(58) Field of Classification Search
CPC .......................... H04L 67/2842; H04L 67/02
See application file for complete search history.

(56) References Cited

U.S. PATENT DOCUMENTS

| | | | | |
|---|---|---|---|---|
| 6,038,601 A * | 3/2000 | Lambert | ........... | G06F 17/30902 370/468 |
| 6,128,623 A * | 10/2000 | Mattis | ............... | G06F 17/30902 707/695 |
| 8,667,183 B1 * | 3/2014 | L'Heureux | ............. | H04L 67/02 709/203 |
| 8,954,492 B1 * | 2/2015 | Lowell, Jr. | .............. | H04L 45/02 370/428 |
| 2005/0261985 A1 * | 11/2005 | Miller | .................... | G06Q 10/06 709/223 |
| 2009/0083279 A1 * | 3/2009 | Hasek | .................. | H04L 67/2823 |
| 2013/0173737 A1 * | 7/2013 | Liu | .................. | H04N 21/23439 709/213 |
| 2014/0108672 A1 * | 4/2014 | Ou | ....................... | H04L 61/1511 709/238 |

OTHER PUBLICATIONS

Fielding, R. et al. "Hypertext Transfer Protocol—HTTP/1.1." Network Working Group. Jun. 1999. 114 pgs.

* cited by examiner

*Primary Examiner* — Oleg Survillo
*Assistant Examiner* — Christopher P Cadorna
(74) *Attorney, Agent, or Firm* — Jaffery Watson Mendonsa & Hamilton, LLP

(57) ABSTRACT

Methods and systems for improving performance of an HTTP cache are provided. According to one embodiment, an HTTP request is received by an ADC for a resource associated with a server on behalf of which the ADC is performing load balancing. The ADC determines based on a local HTTP cache whether it can service the request. The request is parsed to identify a header. The existence or non-existence of locally cached content matching the request is identified by comparing portions of the identified header with corresponding portions of header information of cached content based on a vary rule defining when two headers are meaningfully different. Therefore, the identified header need not exactly match an entirety of the cached information for a cache hit to be found. Responsive to a cache hit, the ADC responds to the request with an HTTP response containing the identified locally cached content.

18 Claims, 12 Drawing Sheets

RULE BASED CACHE PROCESSING IN APPLICATION DELIVERY CONTROLLER FOR LOAD BALANCING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015, Fortinet, Inc.

BACKGROUND

Field

Embodiments of the present invention generally relate to the field of load balancing. More particularly, embodiments of the present invention relate to rule-based processing of a Hypertext Transfer Protocol (HTTP) cache of an Application Delivery Controller (ADC) to efficiently process incoming HTTP requests based on HTTP header information collected by the ADC.

Description of the Related Art

Existing web-based applications/solutions allow users to visit a website using a variety of web browsers, e.g., Internet Explorer, Mozilla Firefox, Google Chrome and Apple Safari, etc., that may be installed on a variety of devices, e.g., computer, laptop, mobile phones, tablets, PDAs, etc., that may run different operating systems, e.g., Windows, Mac, Unix, Linux, Android, etc. Meanwhile, each browser or operating system can have different versions.

A cookie is a small piece of data sent from a website and stored in a user's web browser intended to facilitate interactions with the website. Every time the user visits the website, the browser sends the cookie back to the server to notify the website, for example, of the user's identify, the user's previous activity on the website and the like. There are two different types of cookies, namely, session cookies and persistent cookies. Session cookies are temporary cookies and are deleted when the user closes the browser. As such, when the user visits that particular website again, the website will not recognize the user and will treat him/her as a new user, whereas, persistent cookies remain stored on the user's system for a period defined by the browser preferences such that when the user visits that particular website again, the server hosting the website is able to customize that user's experience in one or more ways based on the persistent information.

Caching is widely used to increase performance by keeping frequently accessed data in a memory, for example, of a client device, an ADC or a server. In the context of web applications, caching helps retain pages and/or data across HTTP requests and facilitates efficient reuse of same thereby taking some load off of web and/or application servers. Each page specifies settings within the page that define whether and how the page is cached. These settings include: cache duration, how multiple variants are constructed based on client input, and various settings controlling proxy and client caching of the returned response. Discovering and managing these settings requires each page to be inspected individually, which quickly becomes a problem on sites having a large amount of content.

Web sites (e.g., large commercial web-sites) receiving large amounts of traffic (e.g., connection requests) typically have a number of servers. Infrastructure supporting such web sites often includes a load balancing device, commonly referred to as an Application Delivery Controller (ADC), which is typically logically interposed between the firewall and the servers in the data-center. An ADC may route user requests to destination servers based on a variety of criteria that the datacenter manager implements using policies and advanced application-layer knowledge to support business requirements.

When a user requests a web page, for example, the browser sends out the request as an HTTP request, which reaches the ADC at the data center. The ADC parses the HTTP request and forwards it to an appropriate server. The server processes the request and responds with a document transmitted in the form of an HTTP response message directed to the requester. The browser then parses the HTTP response, interprets it and renders the document. The response document may be HTML, which may contain references to additional resources such as images, JavaScript files, cascade style sheet (CSS) files, media files, among others. In this case, the browser issues additional requests for these resources. Each request results in one round trip. It is fairly typical for today's web pages to require over 100 round trips. Eventually all these resources are loaded, the browser fully renders the page and the web page is ready for user interaction.

In order to improve the performance of resource retrieval and presentation, ADCs may include a cache that stores one or more responses from servers such that when future requests for corresponding resources arrive from one or more users, cached responses can be forwarded to the client devices of the users. However, for such architectures to work, the HTTP requests and parameters mentioned therein such as in their header fields including cookie values have to match the cached data. For example, existing architectures allow storage of server identifier information of servers from which the responses are received in the cache of the ADC, say in the form of cookie information such as Insert cookie "ADC=Server-2" (indicating that the response came from server 2), which allow the ADC to detect and direct the next HTTP request from a user for the same web resource to Server 2 based on this cookie information. Although the approach allows an ADC to efficiently identify a server to which to direct the request, it does not offload the server. Even with the incorporation of an HTTP cache within an ADC, existing architectures do not provide any means to allow efficient use of cached resources. For example, when using the "Vary" header specified by Request for Comments (RFC) 2616, which is hereby incorporated by reference in its entirety for all purposes, the whole header is specified, therefore minor differences in the header, as a result, for example, of a different user making a request for the same content, cause false cache misses.

There is therefore a need in the art for systems and methods that efficiently combine HTTP caching and ADC load balancing in order to reduce resource utilization of an HTTP cache and achieve higher performance caching.

SUMMARY

Methods and systems are described for reducing resource utilization and improving response-time performance of an HTTP cache by allowing an ADC to pass HTTP parsing knowledge to the cache component. According to one embodiment, an HTTP request is received by an ADC from a client device for a resource associated with at least one of multiple servers on behalf of which the ADC is performing load balancing. The ADC then determines with reference to an HTTP cache of the ADC whether the HTTP request can be serviced by the ADC. The HTTP request is parsed to identify a header contained therein. The existence or non-existence of locally cached content matching the HTTP request is identified by comparing appropriate portions of the identified header with corresponding appropriate portions of multiple headers of content cached within the HTTP cache based on a vary rule automatically generated by the ADC or configured by an administrator of the ADC. Since the vary rule defines when two headers are meaningfully different, the identified header is not required to exactly match up with an entirety of the cached information for a cache hit to be found. When it is determined that the HTTP request can be serviced by the ADC, then the ADC responds to the HTTP request with an HTTP response containing the identified locally cached content.

Other features of embodiments of the present invention will be apparent from the accompanying drawings and from the detailed description that follows.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
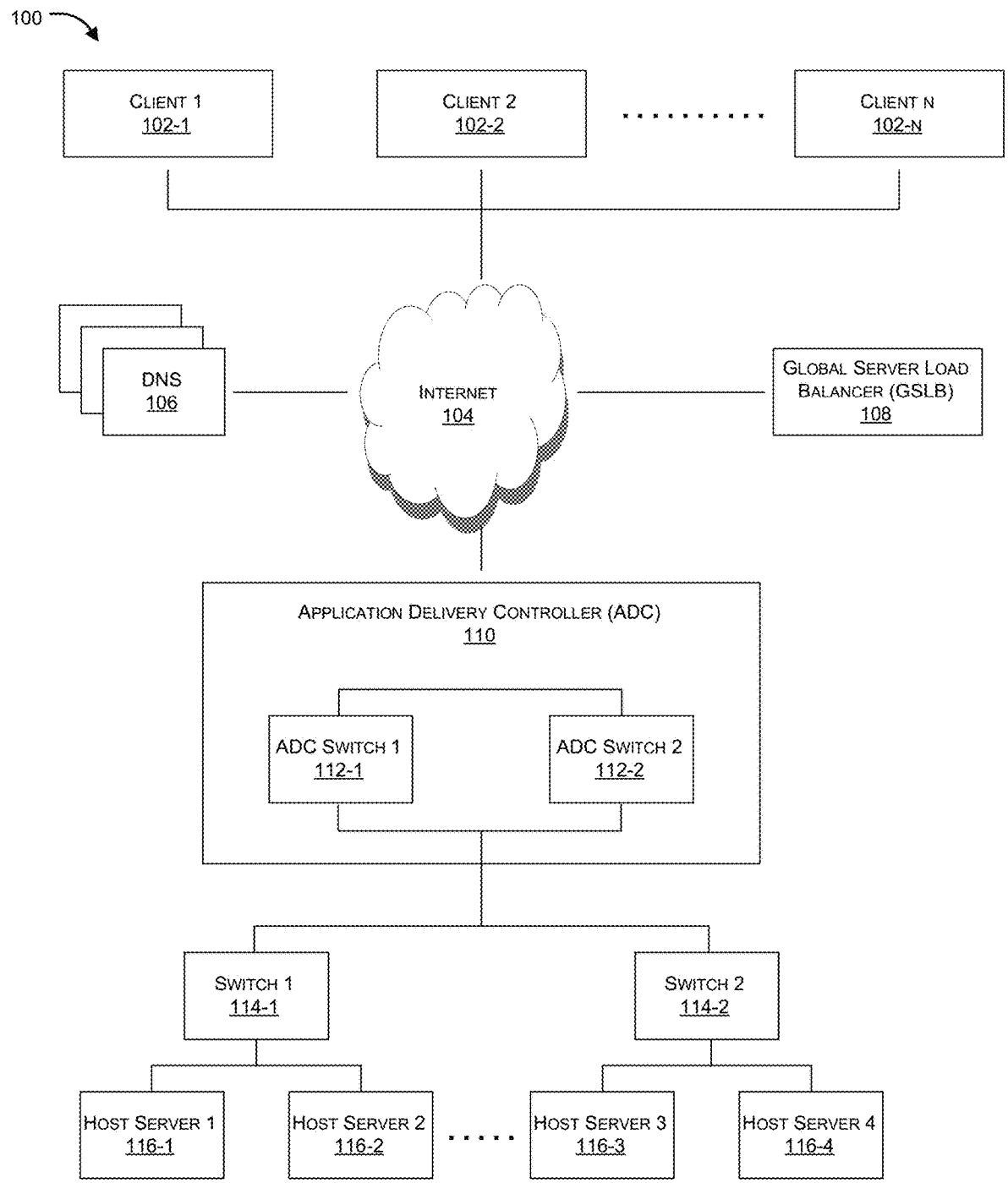
FIG. 1 illustrates an exemplary architecture of an application delivery controller suitable for implementing one or more methods of the present invention.

Methods and systems are provided to reduce resource utilization and improving response-time performance of an HTTP cache by allowing an ADC to pass HTTP parsing knowledge to the cache component. These methods and systems also improve the total web application performance by lowering the client wait-time after a webpage is requested. Aspects of the present disclosure can include methods and systems that can use one or more vary rules to enable matching of a part of header information received from a user's HTTP request with a part of locally cached content within an Application Delivery Controller (ADC) to determine if the locally cached content can be used to service the HTTP request.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Aspects of the present disclosure relate to a method including the steps of receiving, by an Application Delivery Controller (ADC), a Hypertext Transfer Protocol (HTTP) request from a client device for a resource associated with at least one of multiple servers on behalf of which the ADC is performing load balancing. The method can further include the step of determining, by the ADC, with reference to an HTTP cache of the ADC regarding whether the HTTP request can be serviced by the ADC. The determination may be made by parsing the HTTP request to identify a header contained therein, and by then identifying the existence or non-existence of locally cached content matching the HTTP request by comparing appropriate portions of the identified header with corresponding appropriate portions of headers of content cached within the HTTP cache based on a vary rule automatically generated by the ADC or configured by an administrator of the ADC that defines when two headers are meaningfully different. In this manner, the identified header is not required to exactly match up with an entirety of one of the headers for a cache hit to be found. In one embodiment, when a result of the determining step indicates that the HTTP request can be serviced by the ADC, the ADC can respond to the HTTP request with an HTTP response having the identified locally cached content.

In one embodiment, when the result indicates that the HTTP request cannot be serviced by the ADC, a server can be selected by the ADC to service the HTTP request. The identified header can include a cookie header, wherein the vary rule can be configured to define conditions under which the cookie header matches a cached cookie header stored in the HTTP cache, and wherein the cookie header contains information identifying a server that previously processed at least one HTTP request from the client device. In one embodiment, the vary rule can be used in conjunction with a Vary header in the HTTP cache. In yet another aspect, the vary rule may be in the form of a string with one or more wildcards and/or a regular expression.

According to one embodiment, the determination regarding whether the HTTP request can be serviced by the ADC is based on information regarding a server that processed a prior HTTP request by the client device and/or field values of one or more vary fields that the server defined in connection with responding to the prior HTTP request.

According to another embodiment, a load balancing system can include an HTTP request receiving module that can be configured to receive, from a client device, an HTTP request. The system can further include an HTTP request parsing module configured to parse, at an application delivery controller (ADC), the HTTP request to identify one or more headers. The system can further include a cache search module configured to enable searching, by the ADC, so as to determine whether the resource requested by the HTTP request is present in an HTTP cache. When the resource is not present in the cache, load balancing can be performed to allocate the HTTP request to a server of multiple servers on behalf of which the ADC is performing load balancing. The system can further include a rule-based cache hit determination module configured to execute a rule on one or more headers of the HTTP request to determine whether a cache hit is found. When a cache hit is found, then the cached response can be sent back to the client device.

When a cache hit is not found, load balancing can be performed to allocate the received HTTP request to one of the multiple servers. The matching rule can be configured to match cookie information of a header of the HTTP request with cookie information stored in an HTTP cache. The cookie information may include information regarding a server that processed at least one prior HTTP request from the client device. The rule may form part of "vary" field of header information. In an embodiment, a cookie header of the HTTP request stores persistence information.

FIG. 1 illustrates an exemplary architecture 100 of an application delivery controller (ADC) 110 suitable for implementing one or more methods of the present invention. As shown, architecture 100 can include one or more users/client devices such as 102-1, 102-2, . . . , 102-n, which may be collectively referred to client devices 102 hereinafter, that are operatively coupled with an application delivery controller (ADC) 110 through a network (e.g., the Internet, one or more Local Area Networks (LANs), one or more Wide Area Networks (WANs), a cellular network, a telephone network and/or other packet or circuit switched networks. ADC 110 can include one or more ADC switches 112-1 and 112-2 that can enable the ADC 110 to perform load balancing by sending HTTP requests from the client devices 102 to an appropriate server 116 selected from servers 116-1, 116-2, . . . 116-n, to ensure that the requests on the servers are evenly/proportionately/appropriately distributed, for example, keeping in context their configuration, performance attributes, resources stored therein, among other load balancing parameters.

Architecture/topology 100 shown by FIG. 1 can include a number of host servers 116, a number of switches 114 that operatively couple the servers 116 with ADC switches 112 to perform corresponding switching. In an aspect, one (or more) ADC switches 112 may operate in different modes such as stand-alone, active/standby mode, active-active and others.

Clients 102 can include, but are not limited to, end user computers, mobile phones, smartphones, tablet computers, thin clients and the like. In the present example, architecture 100 includes one or more Local DNS servers 106, which may be associated with one or more clients 102 and/or one or more host servers 116. As shown in FIG. 1, the topology 100 may also include a global server load balancer (GSLB) 108, which may employ one or more of the methods disclosed herein.

Generally speaking, load balancing is a technique that may be used for distributing the workload evenly across client networks, host servers 116 and/or other networked resources. Load balancing may enhance utilization of resources and avoid overloading of any individual resource, thereby resulting in increased throughput and/or better response time. GSLB 108 may be considered an extension of load balancing. With this technology, network traffic may be distributed among different web farms, data centers, and host servers 116 located at different geographical locations. As will be appreciated by those skilled in the art, ADC 110 may act as a master to monitor "health" and responsiveness of other sites hosted by host servers 116. ADC 110 may redirect service requests to other host servers 116 if a selected one of host servers 116 does not respond in a timely manner. Furthermore, this technique may allow forwarding visitor requests to a host server 116 located most closely geographically to the origin of the request. In addition, if a traffic threshold is reached at a particular host server 116, the service requests may be forwarded to another host server 116 located at a different geographical location, for example.

As will be appreciated by those skilled in the art, ADC switches 112 may operate in an active mode, backup mode, or some other modes depending on the particular implementation. ADC switches 112 may also provide redundancy protection and failover protection for selected networks or parts of network 104 and may also report their status to selected network elements or other switches such as 114.

In an exemplary embodiment of the present disclosure, ADC 110 can receive a Hypertext Transfer Protocol (HTTP) request from a client device (say from 102-1) for a resource associated with at least one of multiple servers 116 on behalf of which the ADC 110 is performing load balancing. ADC 110 can select a server (based on a load balancing algorithm, for example) to which to send the request. The selected server (e.g., server 116-2) processes the request and can send the. In one embodiment, ADC 110 may inject a cookie into the response including information (e.g., "ADC=Server-116-2") identifying the server that processed the request. The cookie can then be sent back to the requesting client device (e.g., client 102-1) along with the response. In an implementation, ADC 110 can also be associated with a local HTTP cache (not shown) that can cache information associated with the response sent by ADC 110 to client device 102.

In an embodiment of the present invention, when a subsequent request is received for the same resource (by the same client or a different client), ADC 110, with reference to the local HTTP cache, can determine whether the subsequently received HTTP request can be serviced by the ADC 110. In one embodiment, this determination can be performed by ADC 110 by parsing the HTTP request to identify/extract one or more headers contained therein, and by then identifying/evaluating the existence or non-existence of locally cached content matching the HTTP request by comparing appropriate portions of an identified header with corresponding appropriate portions of headers of content cached within the HTTP cache based on a vary rule automatically generated by the ADC 110 or configured by an administrator of the ADC 110 that defines when two headers are meaningfully different. In this manner, the identified header is not required to exactly match up with an entirety of one of the cached headers for a cache hit to be found.

In an instance, when a client 102 sends a subsequent request for the same or a different, but potentially related resource, for example, its header information can be parsed to generate, for instance, apart from other header information, cookie value: ADC=Server-116-2, -Other=Something. A vary rule can be generated/configured by the ADC 110 such that the vary rule can match one or more relevant portions of the parsed header information with the corresponding portion(s) of the cached response. For instance, the cache entry may contain metadata, a portion of which identifies the server from which the corresponding information was received. Based on the automatically generated vary rule, ADC 110 is able to "parse apart" the cookie header and only analyze the relevant ("ADC=Server-116-2") piece, ignoring the irrelevant part ("Other=something"). Therefore, configuration of the vary rule enables matching/comparing of one or more portion(s) of the HTTP header information with one or more corresponding portion(s) of cached response header information rather than matching of the complete string/information for an exact match.

Because vary rules can be generated/configured by the ADC 110 so as to allow the vary rule to perceive HTTP requests that are different in insignificant ways as the same HTTP request, in one embodiment, when a client 102 sends a request for content (e.g., an HTTP request for a particular HTML file), wherein the content was previously retrieved from a server (e.g., host server 116-1), supplied to client 102 by ADC 110 and cached within the local HTTP cache, ADC 110 can offload the server by responding to the HTTP request without involving the server.

The vary rule, in one embodiment, can be a regular expression that can be configured to, for instance, ignore insignificant differences in a request header (e.g., differences in a User-Agent string or a cookie header). In this manner a different cached version of a file need not be stored for every possible difference in the User-Agent string or cookie header and client HTTP requests for the same file, although having a different User-Agent string and/or a different cookie header, can be serviced by ADC without requiring involvement of the server hosting the file at issue.

As those skilled in the art will appreciate, such a construction/architecture enables partial matching of header information, thereby avoiding cache misses that would result from current caching approaches that require the entire HTTP request header to match the cached header.

In one embodiment, when the result of the determination of whether the cached response can be used indicates that the HTTP request can be serviced by ADC 110, ADC 110 can respond to the HTTP request with an HTTP response having the identified locally cached content. When the result indicates that the HTTP request cannot be serviced by ADC 110, one of servers 116 (e.g., host server 116-2) can be selected to service the HTTP request.

In another aspect, identified headers of an HTTP request issued by a client can include a cookie header, a vary header and/or a User-Agent string. The vary rule can be configured to define conditions under which the cookie header matches a cached cookie header stored in the HTTP cache, and wherein the cookie header contains an identifier of a server (such as identifier of 116-2) of the plurality of servers 116 that previously processed at least one HTTP request from the client device 102. In yet another aspect, the vary rule can be used in conjunction with a Vary header in the HTTP cache. In yet another aspect, the vary rule may be in a form of one or more of a string with one or more wildcards and a regular expression.

Figure 2A:
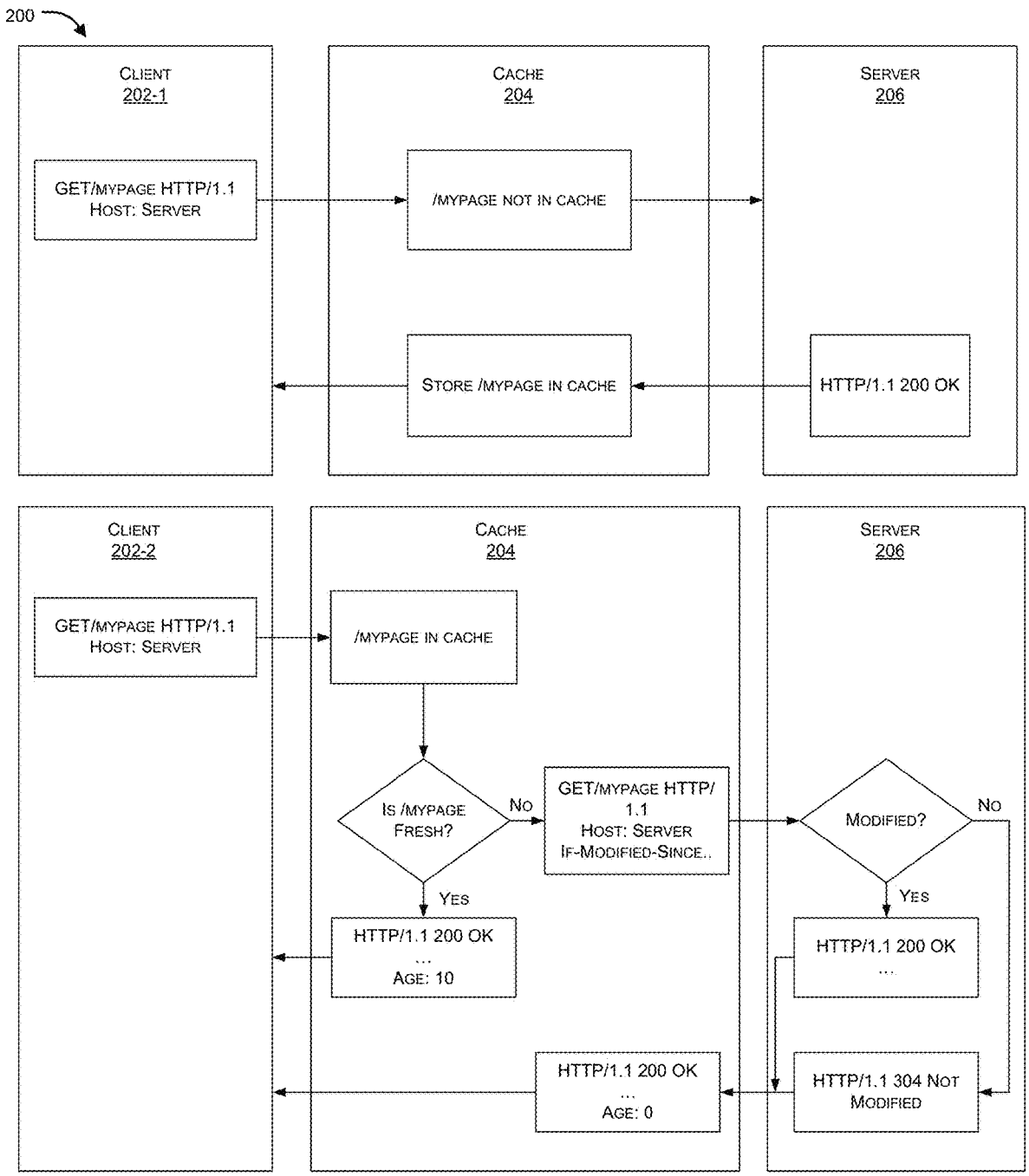
FIGS. 2A-D are exemplary sequence diagrams illustrating prior art processing of HTTP requests by an application delivery controller (ADC).

FIGS. 2A-D are exemplary sequence diagrams illustrating prior art processing of HTTP requests by an application delivery controller (ADC). In the context of FIG. 2A, when a page requested by client 202-1 is not present in cache 204, the request is forwarded to a server 206, which then processes the request and returns back the response. The response can be stored in cache 204 before or after being forwarded to client 202.

On the other hand, in the second scenario, if the page requested for by a client 202-2 (or by client 202-1 or another client) is present in cache 204, cache 204 determines whether the cached page/response is fresh enough for the request, wherein if the response/page is not fresh enough, cache 204 revalidates the entry with origin server 206, wherein server 206 can either reply with a "304 not modified" response (in which case cache 204 can consider the cached entry as fresh and send the cached response), or server 206 can send a new response to be cached and forwarded. On the other hand, when the cached page is fresh, the cache 204 can return the entry as-is (or can insert an age, other headers, or apply additional modifications as configured on the ADC).

Figure 2B:
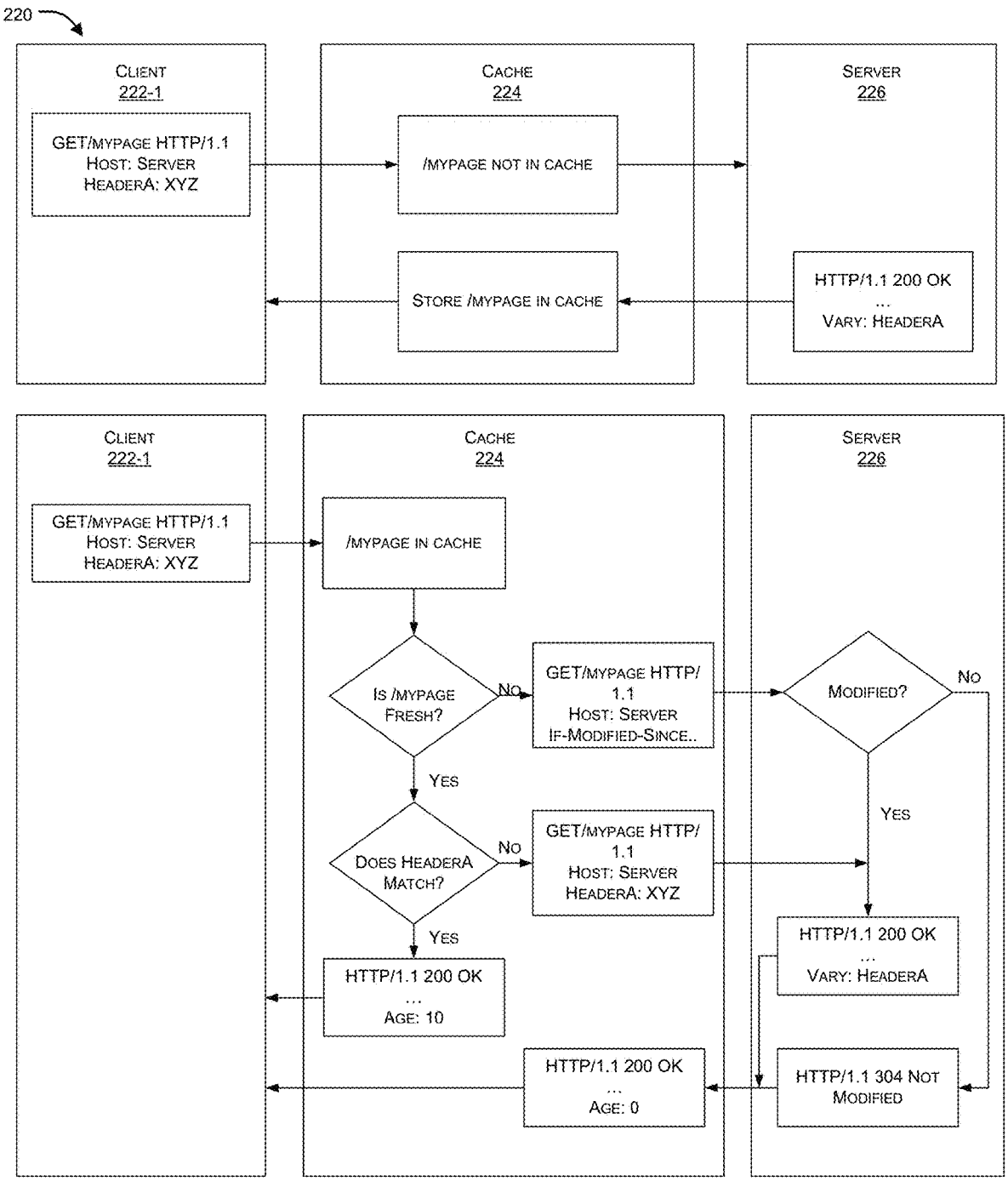

FIG. 2B illustrates a standard cache operation 220 in accordance with RFC 2616 when a "Vary" header is used. When a requested page from client 222-1 is not present in cache 224, the request is forwarded to a server 226, which then processes the request and returns back the response. The response from server 226 can include a vary header, which can direct cache 224 to cache the information in the response according to not only the URL of the request but also the contents of the HTTP header named HeaderA. For example, this header may be the Accept-Language header, in which case a cached response in one language would be considered different from a cached response in a different language. Any other header name can also be specified in the vary header field by server 226. For instance, "Vary" response header can instruct an intermediary cache such as cache 224 that the content data for this response is cacheable but the content data may be different for request data with different request header values. In the context of the present example, the contents of the HTTP header named HeaderA can be sent as part of the response and stored in cache 224.

Subsequently, when the same client 222-1 (or a different client) issues another HTTP request, cache 224 performs a full string comparison between header information of the HTTP request, as specified by the Vary header, to determine whether the prior cached response can be returned. If the full header string is slightly different, cache 224 cannot return the cached version and must send the request on to the server 226 to be processed. As shown, the HTTP request sent by client 222 is checked to determine whether the content is in cache 224 and if so, and if the page/response is fresh, wherein if the page is not fresh, the same tests as discussed above with reference to FIG. 2A are performed by server 226; otherwise, the HTTP request is evaluated by cache 224 to determine whether the HeaderA information present in the header of the HTTP request from the client 222 matches with the HeaderA information cached in cache 224, wherein only if there is an exact match, cache 224 returns back the cached page, else the request is sent to server 226 for re-processing of the request and retrieval of the new page/response.

Figure 2C:
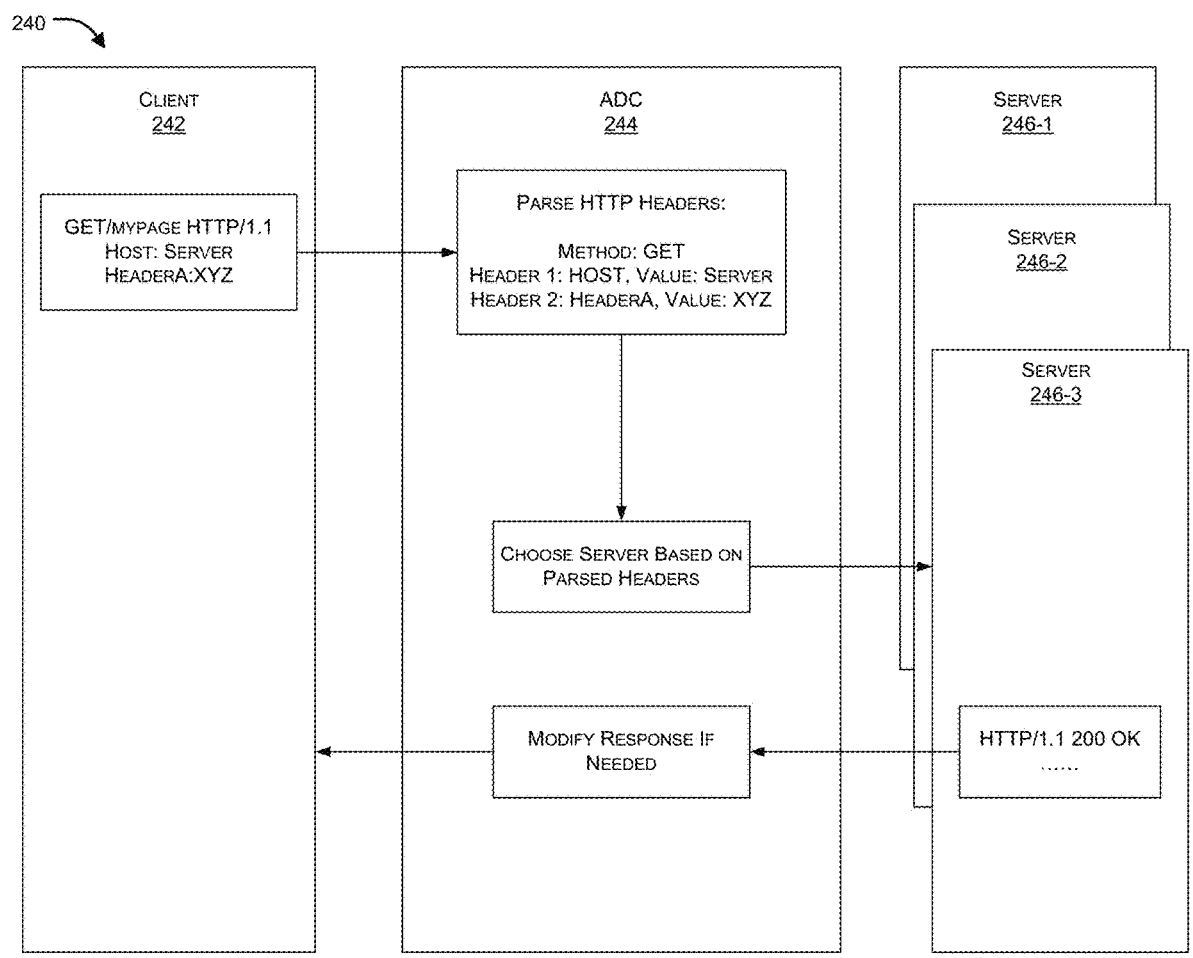

FIG. 2C illustrates a standard Layer 7 ADC operation. A Layer 7 ADC is one which is aware of the application being load balanced. In this case, the application is HTTP or HTTPS. As shown, a client 242 can send an HTTP request seeking a resource, wherein ADC 244, upon receiving the request, can parse the headers of the request so that load balancing and other ADC decisions can be made based on the parsed values. A server 246 can then be selected by ADC 244 based on the parsed header information, and a response from server 246 may be modified before it is sent back to client 242.

Figure 2D:
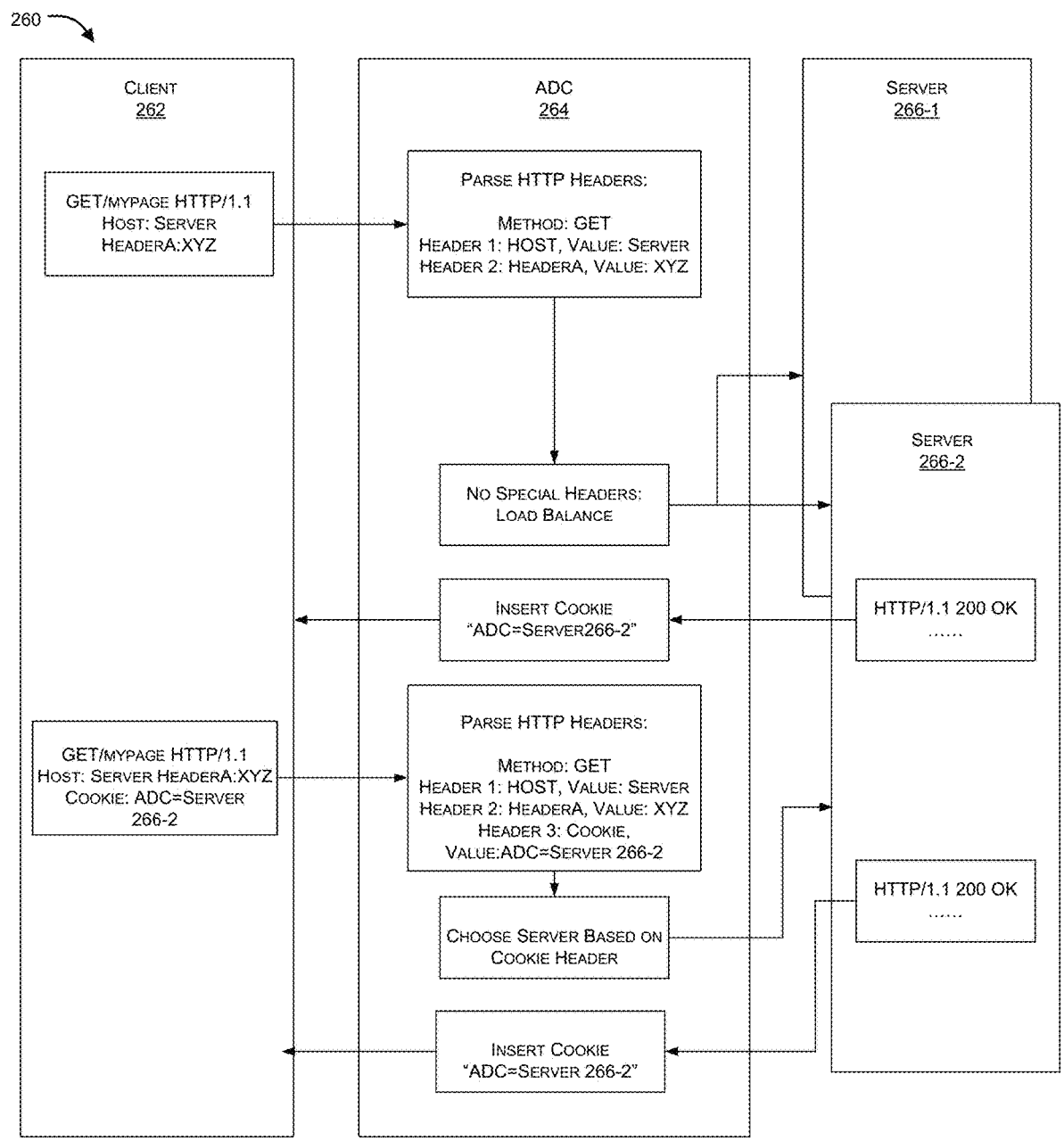

FIG. 2D illustrates an existing Layer 7 ADC operation when cookie persistence is used. As discussed above, client 262 can initially send an HTTP request to an ADC 264, which can then parse the request to evaluate header information thereof to understand/identify if there are any special headers, based on which a server 266 can be selected by ADC 264 to perform load balancing. A response from the selected server 266 can be processed by ADC 264 to include a cookie that can be sent to client device 262 along with the response. In an aspect, the cookie information (e.g., "ADC=Server-266-2") can identify server 266 as the server that processed the HTTP request. The header that is inserted into the response can therefore be a "Set-Cookie" header, which client 262 returns to ADC 264 as part of a "Cookie" header in a subsequent request.

Subsequently, when the same client 262 sends another request for the same resource, ADC 264 can parse the HTTP request to retrieve the cookie information indicating the server that previously processed the request, and accordingly choose the server indicated in the cookie information. However, this approach has limited applicability as ADC 264 does not have a local HTTP cache and therefore the only real optimization is allowing ADC 264 to efficiently identify the appropriate server to which to forward the request.

Figure 3:
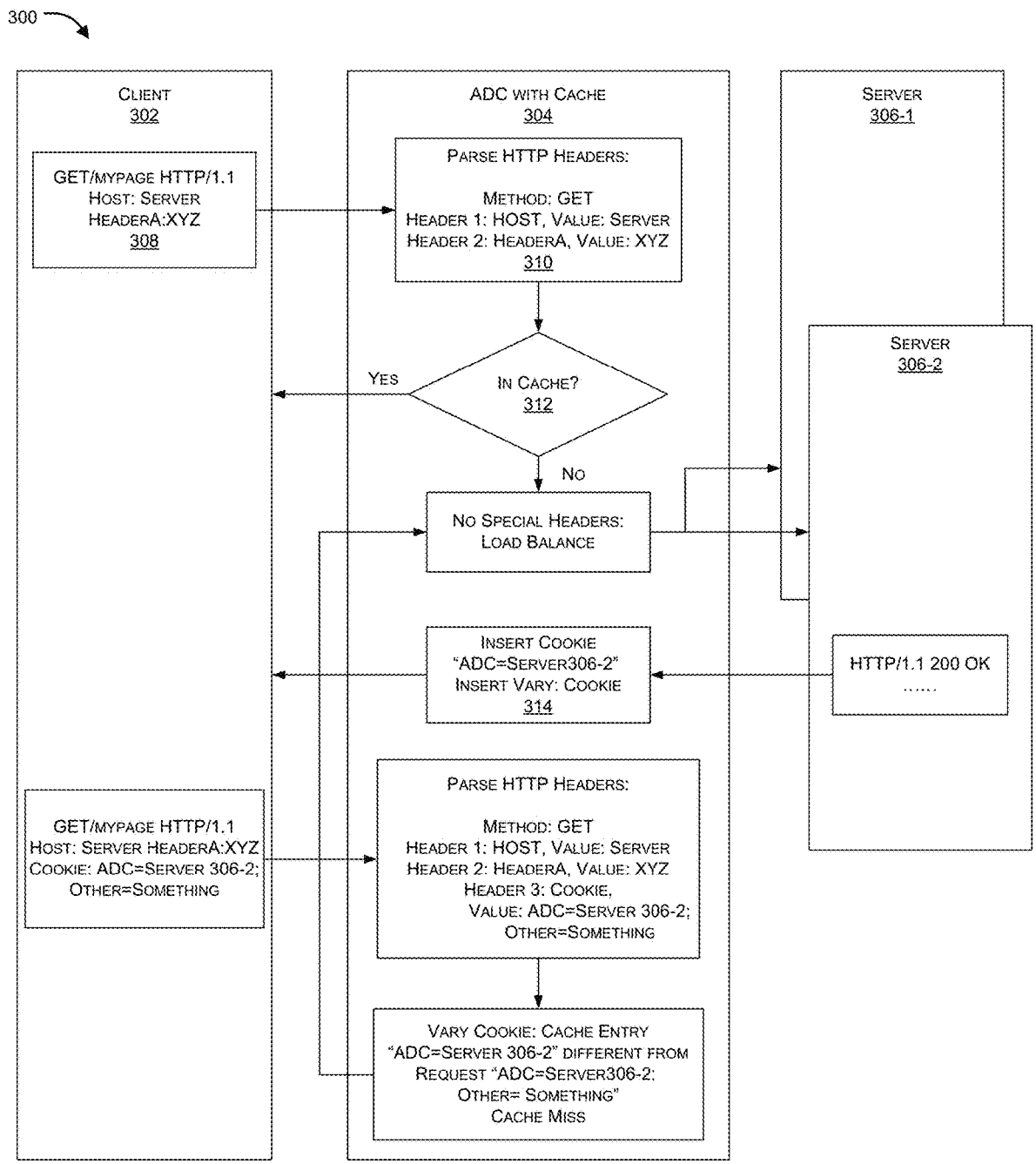
FIG. 3 is a sequence diagram illustrating HTTP request processing by an ADC.

FIG. 3 is a sequence diagram illustrating HTTP request processing by an ADC 304. In the context of the present example, representation 300 shows ADC 304 combined with an HTTP cache. The illustration also demonstrates why the Vary mechanism by itself remains insufficient. As mentioned above, the Vary header is generally inserted by the origin server (e.g., server 306 in the instant case), but server 306 has no knowledge of ADC 304, persistence, or of other servers that are present. Furthermore, the Vary header requires a full string match of the header value. A "Cookie" header can include multiple cookies in a single header and therefore a full string match is improbable, resulting in a cache miss.

As shown in FIG. 3, client 302 can send an HTTP request 308, which can be parsed by ADC 304 (as shown in 310) to identify (at 312) if the requested resource is in the local HTTP cache. When the requested resource is confirmed to be present in the local HTTP cache, the ADC can respond to HTTP request 308 based on the cached content; otherwise, ADC 304 can load balance the request and send it to a server (e.g., server 306-2) to process HTTP request 308. Server 306-2 can accordingly respond to HTTP request 308 and before forwarding the response to client 302, ADC 304 can insert a cookie such as "ADC=Server-306-2" and receive a Vary header from the server 306-2 (as shown in 314), and can send the cookie to client 302 along with the response.

When a subsequent HTTP request is received from client 302, ADC 304 can parse the request to identify the header information including cookie details, wherein the cookie can indicate, for instance, "Cookie Value: ADC=Server-306-2; Other=Something". When ADC 304 then matches the cached response information, which states "Cookie Value: ADC=Server-306-2", based on a full string match (allowed by Vary header), the strings do not match and hence there is a cache miss, and the request needs to be resent back to server 306. The HTTP request in the example therefore would be cached as a separate entry, and would be very unlikely to be used for any client except this one, leading to a waste of resources.

Figure 4:
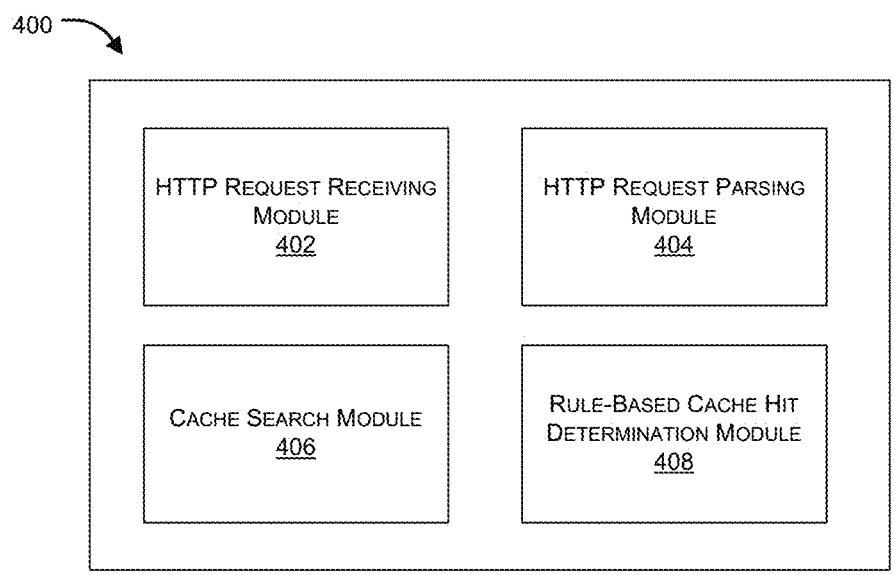
FIG. 4 illustrates exemplary functional modules of a rule-based cache of an ADC in accordance with an embodiment of the present invention.

FIG. 4 illustrates exemplary functional modules of a rule-based cache of an ADC 400 in accordance with an embodiment of the present invention. In the context of the present example, ADC 400 can include an HTTP request receiving module 402, an HTTP request parsing module 404, a cache search module 406, and a rule-based cache hit determination module 408.

HTTP request receiving module 402 can be configured to receive, from a client device, an HTTP request, wherein the request can seek a page/resource from a server of multiple servers to which the ADC is operatively coupled and on behalf of which ADC 400 is performing load balancing, for example. As those skilled in the art will appreciate, depending upon the particular network environment, one or more other network security devices (e.g., firewalls, gateway devices, routers, switches and the like) can be logically interposed between ADC 400 and the client and configured to filter/process/pre-process the received HTTP request.

HTTP request parsing module 404 can be configured to parse the HTTP request to identify one or more headers contained therein. The one or more headers can include cookie information, a User-Agent string and/or other information pertaining to the request, client, desired server/resource. In one embodiment, the header information can include cookie information, such as Server=XYZ, identifying a particular server (XYZ) that had previously processed a request for the same resource. Any other header information that forms part of an HTTP request is completely within the scope of the present disclosure.

Cache search module 406 can be configured to enable searching of a local HTTP cache to determine whether the resource requested by the HTTP request is present in the local HTTP cache. When the resource is not present in the local HTTP cache, load balancing may be performed to select a server to process the HTTP request.

Rule-based cache hit determination module 408 can be configured to execute a vary rule on one or more headers of the HTTP request to determine the existence of a cache hit. The vary rule may be formed to evaluate if cached response is eligible to be sent back to the client device (e.g., based on freshness of the content and the like) such that if the eligibility is confirmed, the cached response can be returned to the client device by ADC 400 without involving the server from which the content was originally served. According to one embodiment, rule-based cache hit determination module 408 can be configured to enable ADC 400 to identify existence or non-existence of locally cached content matching the HTTP request by comparing appropriate portions of the identified header with corresponding appropriate portions of headers of content cached within the local HTTP cache based on a vary rule automatically generated by ADC 400 and/or configured by an administrator of ADC 400 that defines when two headers are meaningfully different. As such, a header of the HTTP request is not required to exactly match up with an entirety of a cached header for a cache hit to be found.

In one embodiment, ADC 400 can receive a Hypertext Transfer Protocol (HTTP) request from a client device for a resource associated with at least one of multiple servers on behalf of which ADC 400 is performing load balancing. ADC 400 can then send the request after load balancing to a particular server, based on which the selected server can process the request for the desired resource and can send the response along with a cookie indicating, for instance, that the request was processed by server. Such a cookie can alternatively be inserted by ADC 400. In an instance, the cookie, among other information, can have a field-value pair such as "ADC=Server XYZ", identifying the server that processed the request for future reference/use by ADC 400. For example, the cookie can accompany a subsequent HTTP request by the client device. In an embodiment of the present invention, ADC 400 includes a local HTTP cache into which ADC 400 may store HTTP request headers and associated content previously retrieved for client devices.

In an embodiment of the present invention, when a client device subsequently makes a request for content previously cached, ADC 400 may service the request even when the request headers are not identical to the cached headers as described above.

The vary rule configured on the ADC can take the form of a header name and a list of parameters identifying whether two instances of this header are equal for the purposes of caching. For example, the rule may contain the header name "Cookie" and parameters indicating that two "Cookie" headers are equivalent if their values both match this regular expression: ".*ADC=.*;.*". Alternately, a rule parameter may indicate that two "User-Agent" headers are equivalent if they both contain the string "Safari", regardless of the rest of the User-Agent header value.

In an instance, when the same client again sends a request for the same resource, its header information can be parsed to generate, for instance, apart from other header information, cookie value: ADC=Server-A, Other=Something. A vary rule can be generated/configured by ADC 400 such that the rule can match one or more relevant portions of the parsed header information with corresponding portions of the cached response. For instance, if the cached response also stores cookie value: ADC=Server-A, Other=Something_1, the vary rule can retrieve the relevant portion, i.e., ADC=Server-A and match/compare it with the relevant portion of the locally cached response i.e. ADC=Server-A to confirm the existence/matching of locally cached content with the HTTP request (by comparing appropriate portions of the identified header with corresponding appropriate portions of a plurality of headers of content cached within the HTTP cache). Therefore, configuration of the matched rule enables matching/comparing of a portion(s) of the HTTP header information with a portion(s) of the cached response header information rather than matching of the complete string/information for an exact match.

According to one embodiment, a header of the one or more headers of the HTTP request that stores persistence information is a cookie header. According to another embodiment, eligibility of the cached information for use can be confirmed based on information selected from one or a combination of the server that processed prior requests, and field values of one or more vary fields that the server defined in connection with responding to a prior HTTP request. For instance, as mentioned above, a server, while responding to a request can insert a vary header and/or information indicating that the server had processed that request, wherein during a match, the rule can be configured to match the content of the vary field in the header information of the HTTP request with the vary field information of the header that is cached in the local HTTP cache of ADC 400. According to another embodiment, the rule can be configured to perform matching based on any or a combination of full string matching, substring matching, semantic matching, list matching and regular expression matching.

The Vary header as returned by the server may be used to automatically create Vary rules within the ADC/Cache. For example, the ADC administrator may configure policies wherein HeaderA is to be compared differently than HeaderB. It isn't until a server response contains the header Vary: HeaderA that the ADC automatically creates a rule based on the appropriate policy.

Similarly, the ADC may create Vary rules automatically, without input from a server. For example, the Cookie: header may be inserted by the ADC and the server may not be able to identify that a Vary header is necessary. However, the ADC is able to create an automatic rule to differentiate relevant cookies.

As will be appreciated by those skilled in the art, although embodiments of the present invention are explained with reference to HTTP requests, the methods and systems described herein have applicability to other requests, including, but not limited to, service requests, web service requests, secure HTTP (HTTPS) requests, file transfer requests (e.g., File Transfer Protocol (FTP) requests), Session Initiation Protocol (SIP) session requests, video or audio streaming requests and Web conferencing session requests.

Figure 5:
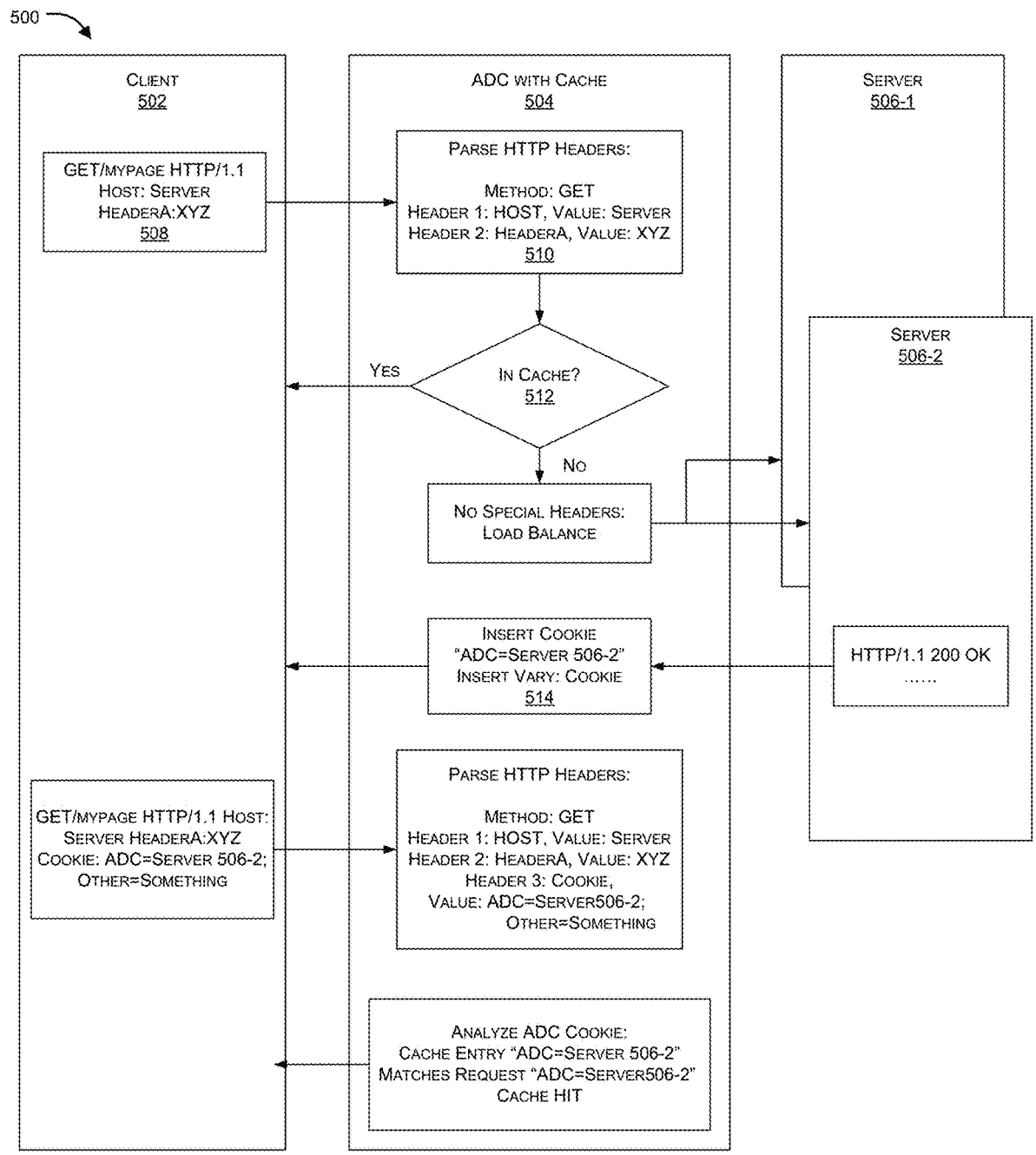
FIG. 5 is a sequence diagram illustrating rule-based cache processing in an ADC in accordance with an embodiment of the present invention.

FIG. 5 is a sequence diagram 500 illustrating rule-based cache processing in an ADC 504 in accordance with an embodiment of the present invention. In the context of the present example, a client 502 can send an HTTP request 508, which can be parsed by ADC 504 (as shown in 510) to identify (at 512) whether the requested resource is in the a local HTTP cache. If so, then the resource can be returned to the requesting client by ADC 504; otherwise, ADC 504 can load balance the request and send it to a selected server (e.g., server 506-2) for processing. Server 506-2 can accordingly provide a response to the request to ADC 504 and include within the response, a cookie, including, among other information, a name-value pair such as "ADC=Server-506-2" and provide a Vary header (as shown in 514). ADC 504 may cache the response and forward it along to client 502.

Responsive to a subsequent request from client 502, ADC 504 can parse the request to identify header information including cookie details, wherein the cookie can indicate, for instance, "Cookie Value: ADC=Server-506-2; Other=Something". In one embodiment, ADC 504 has previously configured/generated a vary rule that extracts one or more relevant portions from the cookie value i.e. ADC=Server-506-2 and matches it with the corresponding cached header information i.e. ADC=Server-506-2 and declares an affirmative match through a cache hit. Therefore, the vary rule of ADC 504 can perform partial header information extraction and matching with corresponding partial header information stored in the HTTP cache. ADC 504 can therefore identify existence or non-existence of locally cached content matching the HTTP request by comparing appropriate portions of the identified header with corresponding appropriate portions of headers of content cached within the HTTP cache based on the vary rule that defines when two headers are meaningfully different. As such, extraneous information contained within HTTP request headers that may be different for different clients, for example, may be ignored and HTTP requests that would typically result in an HTTP cache miss can now result in an HTTP cache hit. In an aspect, the vary rule can be used in conjunction with a vary header and can analyze portions of headers rather than the entire header.

Figure 6:
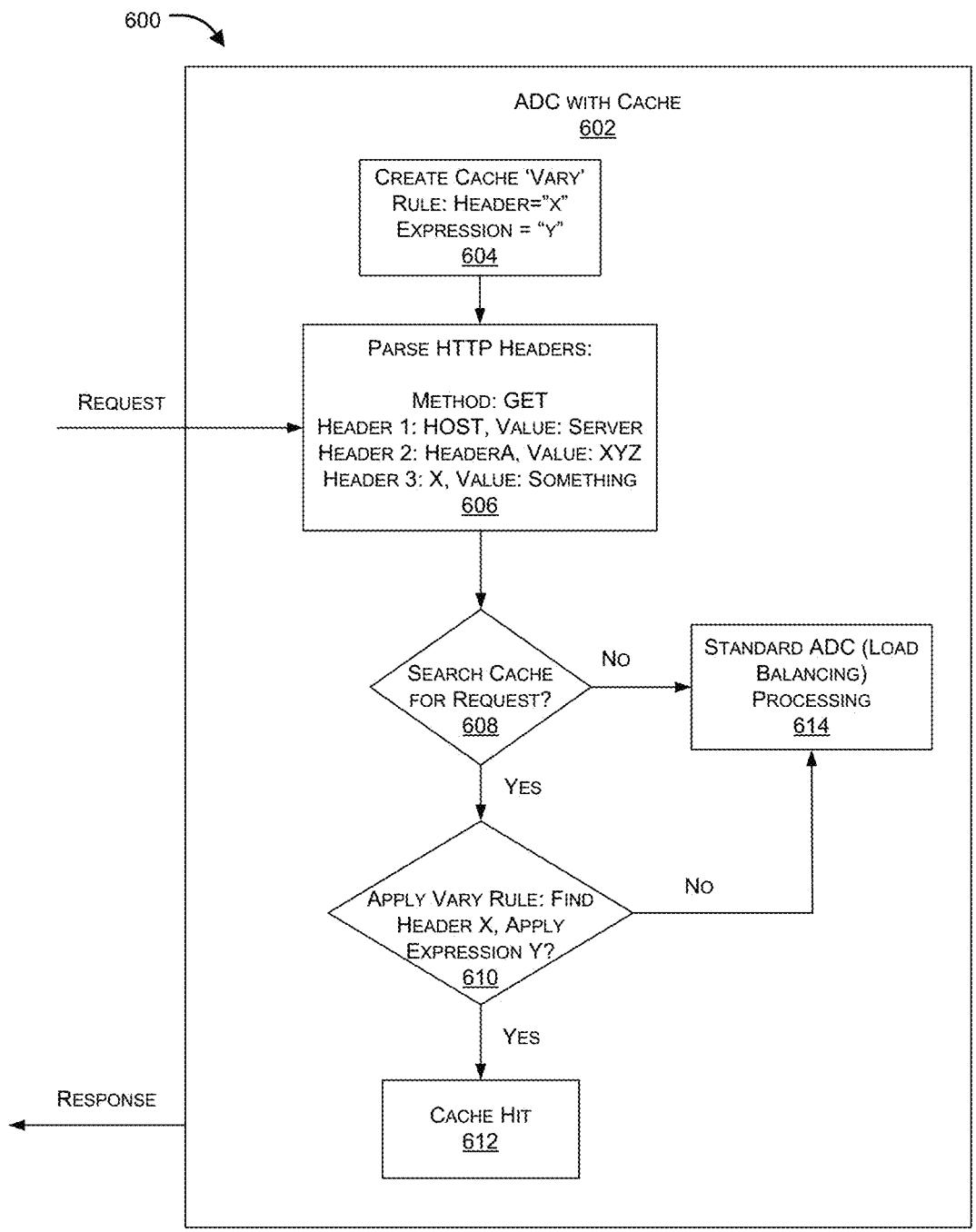
FIG. 6 is a sequence diagram illustrating vary rule expression processing to determine a cache hit in accordance with an embodiment of the present invention.

FIG. 6 is a sequence diagram 600 illustrating vary rule expression processing to determine a cache hit in accordance with an embodiment of the present invention. In the context of the present example, an ADC 602 can, at 604, create a cache vary rule defining a header portion a vary rule and an expression part of the vary rule, say Header=X and Expression=Y. Once the vary rule is defined, responsive to receiving a client request for a resource (at block 606), ADC 602 can parse the request to identify one or more headers (e.g., Header 1, Header 2, among others). At step 608, ADC 602 can determine whether the requested resource is in the local HTTP cache. If so, at 610, ADC 602 applies the vary rule based on the HTTP request by defining Header to be say X=1, and Expression to be say Y=Server Identifier. When, the locally cached header information matches the defined rule, a cache hit is confirmed at 612 and the cached response is sent back to the client. When the local HTTP cache does not have the response/resource/file/page specified by the HTTP request at 608, standard load balancing can be performed by ADC 602 at 614. Therefore, in an aspect, a 'vary rule' can be created at configuration time, and then applied after otherwise matching cache entries are found.

According to one embodiment, Vary rule or any other rule can be configured by the ADC to evaluate desired portions of the HTTP request header and understand if such portions match with the locally cached content in the ADC cache. Use of the rule can allow an ADC administrator to embed application knowledge into the ADC configuration, which can lead to multiple cache entries being combined into a single cache entry. In another aspect, multiple rule types can exist. For instance, the rule can be a full vary rule that can match specific header information in full with the corresponding header information stored in the cache. For instance, if the header information states SessionID: 1234, any difference in the SessionID header will be considered a different request and cached separately. Alternatively, the rule may require only a portion of the header information to match (e.g., a substring match).

This means that an ADC/Cache is able to minimize the number of cache entries by combining entries that other caches may keep separate. However, the mechanism is fully compatible with interoperability with other caches. If a second cache is placed on the server side of the ADC/Cache, this second cache would contain multiple entries for similar items. The ADC/Cache would then combine these entries into a single entry and subsequent customer requests would result in fewer requests between the ADC/Cache and second cache. Likewise, if a second cache is placed on the client side of the ADC/Cache, entries considered equivalent on the ADC/Cache (and therefore stored as one) would be converted into multiple entries in the second cache. However, although additional resources would be used on the second cache, the ADC/Cache would continue to combine these entries and minimize origin server requests.

In yet another aspect, a rule type can also be configured for a semantic match, wherein this type of rule can be used when the ADC has semantic knowledge of the HTTP stream that can be used for 'Vary' decisions. One example of this is the persistence cookie. The server does not insert any 'Vary' header. The ADC knows how persistence works since it inserted the cookie in the first place. Therefore, it can apply a specific rule to match requests to cache entries. It is to be appreciated that although few of the examples are being described with reference to cookie header, persistence/server information can be inserted in any other header, all of which are completely within the scope of the present disclosure.

In yet another aspect, a rule type can also be configured for a regular expression match, wherein this match is similar to the substring match but allows for regular expressions to be applied. This is useful for scenarios where an exact string match is difficult or impossible. For example: User-Agent: Mozilla/5.0 (Macintosh; Intel Mac OS×10_7_5) AppleWebKit/537.36 (KHTML, like Gecko) Chrome/34.0.1847.131 Safari/537.36. A rule could be applied to this header that searches for the browser type somewhere in the string, for example. An administrator can then configure a rule like ".*(.*)/[0-9\.]+" to configure different browser request/responses to be cached as separate entries.

Figure 7:
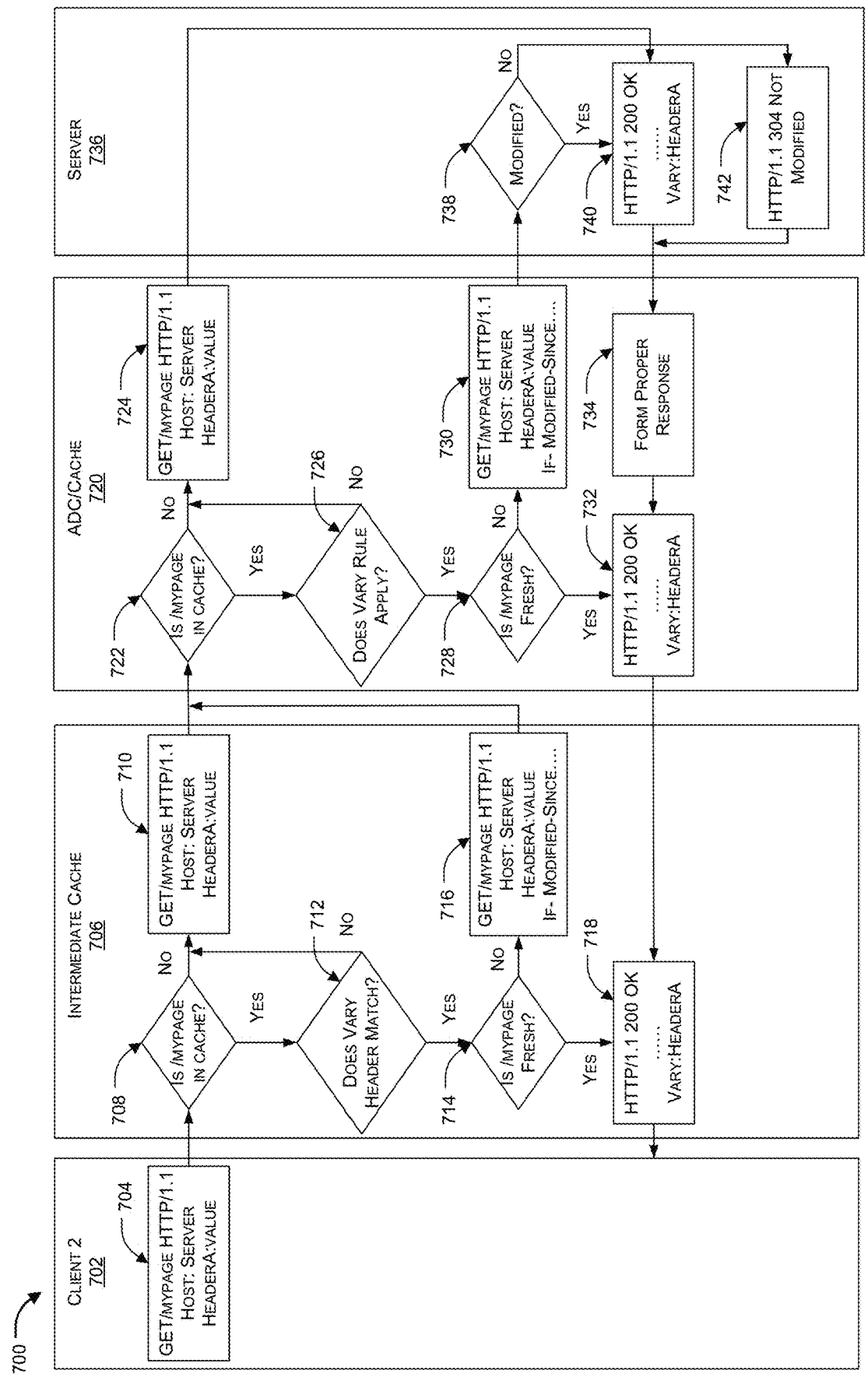
FIG. 7 is a sequence diagram illustrating rule-based cache processing in accordance with an alternative embodiment of the present invention.

FIG. 7 is a sequence diagram 700 illustrating rule-based cache processing in accordance with an alternative embodiment of the present invention. In the context of the present example, an intermediate HTTP cache 706 is configured between client 702 and ADC 720 having a local HTTP cache, wherein ADC 720 can be operatively coupled with one or more servers, which may be collectively referred to as servers 736. In an implementation, at step 704 client 702 can send an HTTP request to intermediate cache 706, which can check, at 708, if the requested page/resource is in its cache 706. In case the page is in the cache 706, at step 712, it is determined if the vary header of the HTTP request matches with that cached in the cache 706, such that in case the vary header matches, at step 714, it can be checked if the cached page is fresh and if yes, the page can be sent to the client at 718. In case the page is not fresh, the received HTTP request is sent to the ADC 720 for further processing at step 716. In another aspect, if the page is not present in the cache at 706 or if the vary header does not match at 712, the HTTP request can be sent to the ADC 720 at step 710.

As shown, once the request is received at the ADC 720, it is checked at 722 if the requested page/resource is in the cache of the ADC, which if found affirmative, can enable the ADC to apply, at step 726, the configured Vary Rule having say a regular expression for matching relevant header information from the HTTP request with the extracted relevant cached information. If a rule match is found, at step 728, it can be checked if the page/resource is fresh, which if affirmative, can enable the cached page to sent to the client 702. Else, if the page is not fresh at 730, or if the rule match does not take place or if the page is not the ADC cache (at block 724), load balancing can be performed by the ADC 720 and the request can be sent to an appropriate server 736 to process the request and send the revised page/resource. In case the server 736 at 738 identifies that there is no modification in the requested resource (742), the response is sent accordingly and the resource can be sent back to the client 720.

In an aspect therefore, if there are other caches such as 706 present in the stream between client 702 and server 736, the caches can process standard Vary headers as supplied by the server 736, but the ADC 720 can still enhance the overall traffic flow. It is to be appreciated that the operation of the Intermediate Cache 706 and that of the ADC/Cache 720 are almost identical, except that the ADC/Cache 720 can process a "Vary rule" rather than the standard Vary header as defined by RFC 2616. Because of this, the result of this step can be different. For instance, a request can be considered to be the same as another request in the ADC/Cache 720 (due to possibility of partial matching due to rules) where it wasn't in the Intermediate cache 706 (due to exact matching through vary header). When this happens, the vary rule mechanism saves the additional resources on the server 736 since the ADC/Cache 720 is able to send a cached copy. Otherwise, even though the same response is being sent by the ADC/Cache 720 to intermediate caches 706, they are treated as different responses and cached separately by the intermediate caches 706.

Figure 8:
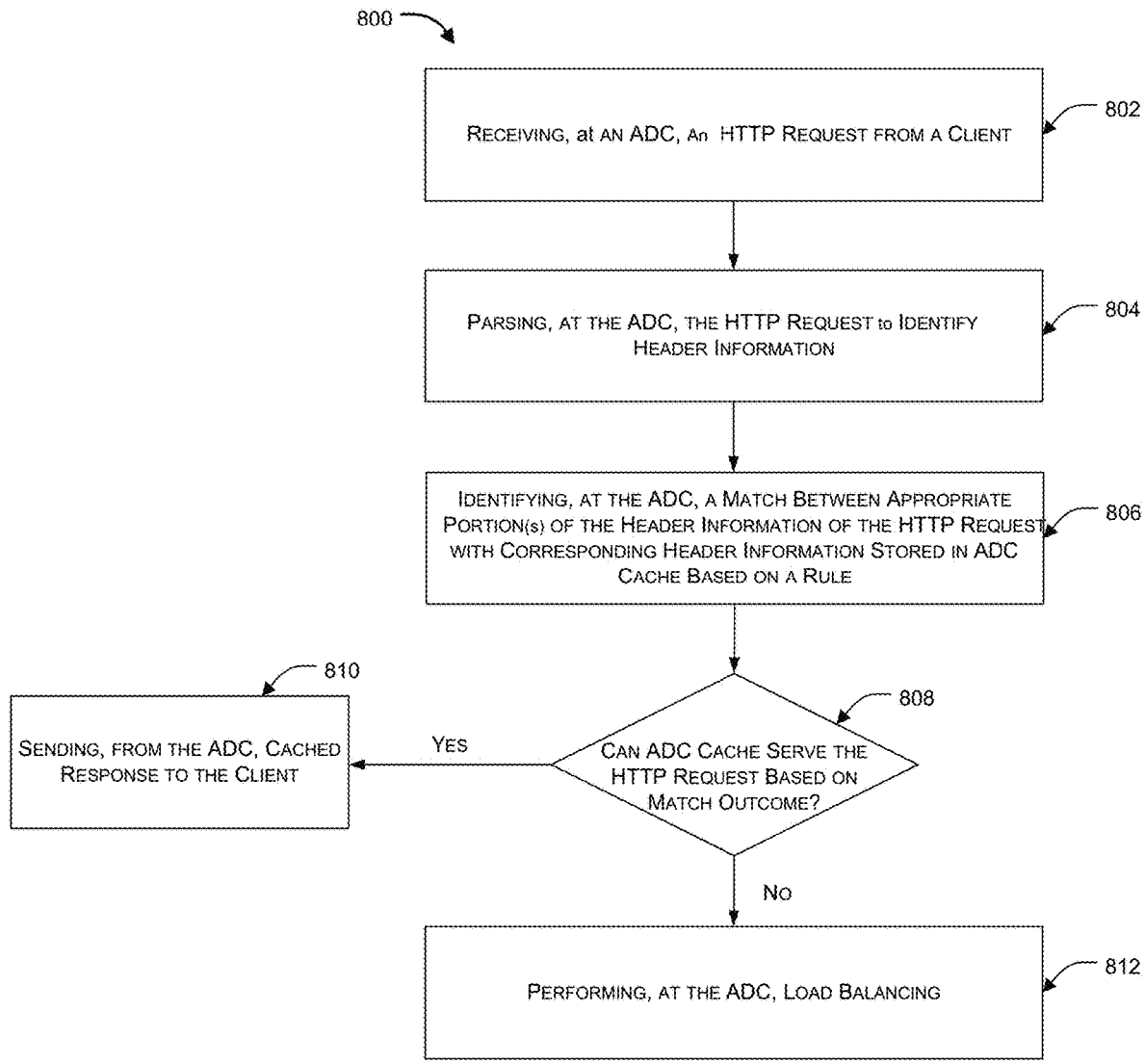
FIG. 8 is a flow diagram illustrating rule-based cache processing in an ADC in accordance with an embodiment of the present disclosure.

FIG. 8 is a flow diagram 800 illustrating rule-based cache processing in an ADC in accordance with an embodiment of the present disclosure. In one embodiment, this rule-based cache processing allows an ADC/Cache to reduce the number of cache entries by combining entries that would otherwise be maintained separately.

At step 802, an ADC can receive an HTTP request from a client device for a resource associated with at least one of multiple servers on behalf of which the ADC is performing load balancing. At step 804, the ADC can parse the HTTP request to identify header information contained therein.

At step 806, the ADC can identify existence or non-existence of locally cached content matching the HTTP request by comparing appropriate portions of the identified header with corresponding appropriate portions of one or more headers of content cached within the HTTP cache based on a vary rule that defines when two headers are meaningfully different.

At step 808, based on the outcome of rule-based matching, the ADC can determine whether its cache can serve the HTTP request, wherein in case the cache is determined to be able to serve the HTTP request, the cached response can be sent to the client device at 810, else, the ADC, at 812, can perform load balancing and send the HTTP request for processing to a server.

Figure 9:
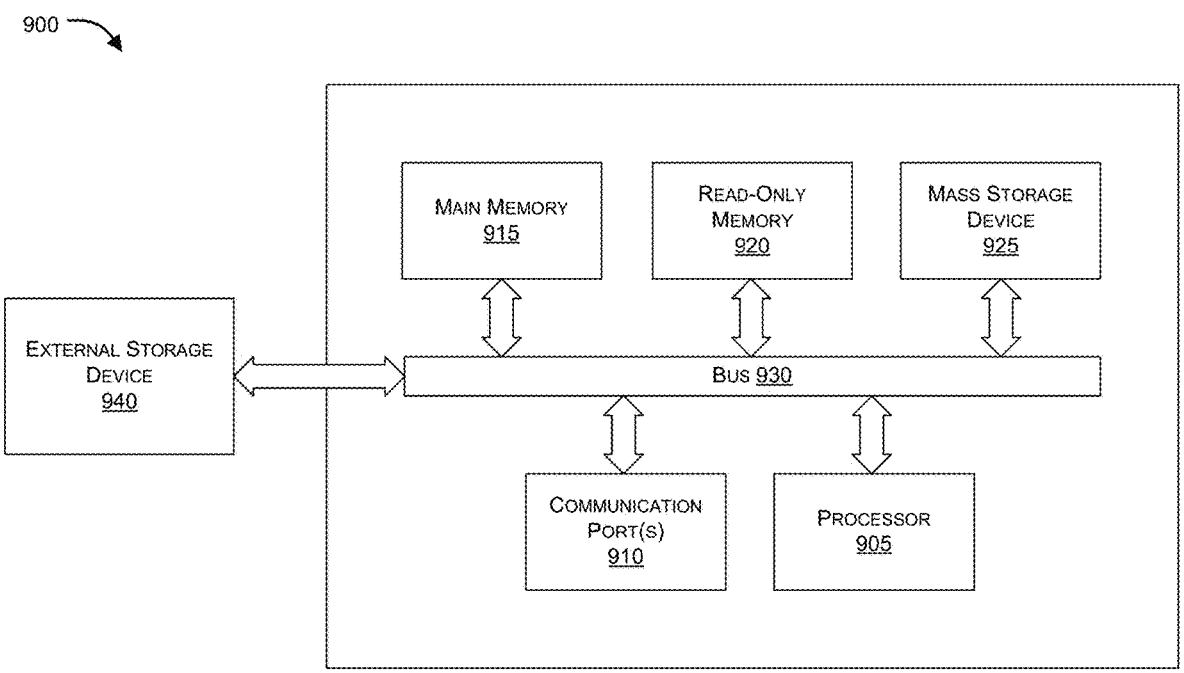
FIG. 9 is an exemplary computer system in which or with which embodiments of the present invention may be utilized.

FIG. 9 is an exemplary computer system 900 in which or with which embodiments of the present invention may be utilized. Computer system 900 may represent or form a part of an ADC or another type of intermediate networking device logically interposed between clients and servers and performing content caching.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 900 includes a bus 930, a processor 905, communication port 910, a main memory 915, a removable storage media 940, a read only memory 920 and a mass storage 925. A person skilled in the art will appreciate that computer system 900 may include more than one processor and communication ports.

Examples of processor 905 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 905 may include various modules associated with embodiments of the present invention.

Communication port 910 can be any of an RS-232 port for use with a modem based dialup connection, a 10/100 Ethernet port, a Gigabit or 10 Gigabit port using copper or fiber, a serial port, a parallel port, or other existing or future ports. Communication port 910 may be chosen depending on a network, such a Local Area Network (LAN), Wide Area Network (WAN), or any network to which computer system 900 connects.

Memory 915 can be Random Access Memory (RAM), or any other dynamic storage device commonly known in the art. Read only memory 920 can be any static storage device(s) such as, but not limited to, a Programmable Read Only Memory (PROM) chips for storing static information such as start-up or BIOS instructions for processor 905.

Mass storage 925 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 930 communicatively couples processor(s) 905 with the other memory, storage and communication blocks. Bus 930 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 905 to system memory.

Optionally, operator and administrative interfaces, such as a display, keyboard, and a cursor control device, may also be coupled to bus 930 to support direct operator interaction with computer system 900. Other operator and administrative interfaces can be provided through network connections connected through communication port 910.

Removable storage media 940 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:

1. A method comprising:
providing a vary rule for execution by a cache hit determination module of an Application Delivery Controller (ADC), wherein the vary rule is generated by the ADC or configured by an administrator of the ADC, wherein the vary rule specifies a Hypertext Transfer Protocol (HTTP) header by name and specifies a rule to be applied to the specified HTTP header in connection with determining whether a value contained within the specified HTTP header of an HTTP request at least partially matches the specified HTTP header of locally cached content within an HTTP cache of the ADC;
receiving, by the ADC an HTTP request from a client device for a resource associated with at least one of a plurality of servers on behalf of which the ADC is performing load balancing;
determining, by the ADC, with reference to the HTTP cache whether the HTTP request can be serviced by the ADC by:
parsing, by the ADC, the HTTP request to identify the specified HTTP header contained therein; and
identifying existence or non-existence of locally cached content at least partially matching the HTTP request by comparing a value of the identified header with a value of the specified HTTP header within a plurality of HTTP headers of content cached within the HTTP cache based on the rule specified in the vary rule, wherein the identified header comprises a cookie header, wherein the vary rule is configured to define conditions under which the cookie header at least partially matches a cached cookie header stored in the HTTP cache, and wherein the cookie header contains an identifier of a server of the plurality of servers that previously processed at least one HTTP request from the client device; and
when a result of said determining indicates the HTTP request can be serviced by the ADC, then responding to the HTTP request, by the ADC, with an HTTP response containing the identified locally cached content.

2. The method of claim 1, further comprising when the result indicates the HTTP request cannot be serviced by the ADC, then selecting a server of the plurality of servers to service the HTTP request.

3. The method of claim 1, wherein the HTTP header specified by the vary rule is a Vary header.

4. The method of claim 1, wherein the rule specified by the vary rule is in a form of a regular expression.

5. The method of claim 1, wherein the result is based on one or more of information regarding a server of the plurality of servers that processed prior HTTP requests by the client device and field values of one or more vary fields that the server defined in connection with responding to the prior HTTP requests.

6. The method of claim 1, further comprising generating, by the ADC, the vary rule responsive to receipt by the ADC of an HTTP response from one of the plurality of servers containing an HTTP header identified within a policy defined by the administrator of the ADC.

7. The method of claim 1, further comprising automatically generating, by the ADC, the vary rule based on semantic knowledge of the ADC regarding an HTTP stream at issue.

8. The method of claim 1, wherein the HTTP header specified by the vary rule is a user-agent header.

9. The method of claim 1, wherein the HTTP header specified by the vary rule is a cookie header.

10. A non-transitory computer-readable storage medium embodying a set of instructions, which when executed by one or more processors of an Application Delivery Controller (ADC), causes the one or more processors to perform a method comprising:
  providing a vary rule for execution by a cache hit determination module of the ADC, wherein the vary rule generated by the ADC or configured by an administrator of the ADC, wherein the vary rule specifies a Hypertext Transfer Protocol (HTTP) header by name and specifies a rule to be applied to the specified HTTP header in connection with determining whether a value contained within the specified HTTP header of an HTTP request at least partially matches the specified HTTP header of locally cached content within an HTTP cache of the ADC;
  receiving an HTTP request from a client device for a resource associated with at least one of a plurality of servers on behalf of which the ADC is performing load balancing;
  determining with reference to the HTTP cache whether the HTTP request can be serviced by the ADC by:
    parsing the HTTP request to identify the specified HTTP header contained therein; and
    identifying existence or non-existence of locally cached content at least partially matching the HTTP request by comparing a value of the identified header with a value of the specified HTTP header within a plurality of HTTP headers of content cached within the HTTP cache based on the rule specified in the vary rule, wherein the identified header comprises a cookie header, wherein the vary rule is configured to define conditions under which the cookie header at least partially matches a cached cookie header stored in the HTTP cache, and wherein the cookie header contains an identifier of a server of the plurality of servers that previously processed at least one HTTP request from the client device; and
  when a result of said determining is affirmative, then responding to the HTTP request with an HTTP response containing the identified locally cached content.

11. The non-transitory computer-readable storage medium of claim 10, further comprising when the result is negative, then selecting a server of the plurality of servers to service the HTTP request.

12. The non-transitory computer-readable storage medium of claim 10, wherein the HTTP header specified by the vary rule is a Vary header.

13. The non-transitory computer-readable storage medium of claim 10, wherein the rule specified by the vary rule is in a form of a regular expression.

14. The non-transitory computer-readable storage medium of claim 10, wherein the result is based on one or more of information regarding a server of the plurality of servers that processed prior HTTP requests by the client device and field values of one or more vary fields that the server defined in connection with responding to the prior HTTP requests.

15. The non-transitory computer-readable storage medium of claim 10, wherein the method further comprises generating the vary rule responsive to receipt by the ADC of an HTTP response from one of the plurality of servers containing an HTTP header identified within a policy defined by the administrator of the ADC.

16. The non-transitory computer-readable storage medium of claim 10, wherein the method further comprises automatically generating the vary rule based on semantic knowledge of the ADC regarding an HTTP stream at issue.

17. The non-transitory computer-readable storage medium of claim 10, wherein the HTTP header specified by the vary rule is a user-agent header.

18. The non-transitory computer-readable storage medium of claim 10, wherein the HTTP header specified by the vary rule is a cookie header.

* * * * *